United States Patent [19]

Houtman

[11] Patent Number: 4,754,741
[45] Date of Patent: Jul. 5, 1988

[54] FUEL CONDITIONER ASSEMBLY

[75] Inventor: William H. Houtman, Ann Arbor, Mich.

[73] Assignee: Stirling Power Systems Corporation, Ann Arbor, Mich.

[21] Appl. No.: 8,630

[22] Filed: Jan. 29, 1987

[51] Int. Cl.$^4$ .......................................... F02M 31/00
[52] U.S. Cl. .................................... 123/552; 123/549; 123/557
[58] Field of Search ............. 123/510, 514, 516, 546, 123/547, 549, 552, 557

[56] References Cited

U.S. PATENT DOCUMENTS

| | | | |
|---|---|---|---|
| 2,599,699 | 6/1952 | Dilworth et al. | 123/516 |
| 4,434,773 | 3/1984 | Granetzke | 123/552 |
| 4,501,255 | 2/1985 | Van Der Ploeg et al. | 123/549 |
| 4,606,317 | 8/1986 | Jauch et al. | 123/514 |

*Primary Examiner*—Willis R. Wolfe
*Assistant Examiner*—M. Macy
*Attorney, Agent, or Firm*—Rhodes and Boller

[57] ABSTRACT

A compact fuel conditioner assembly which performs fuel heating and pressure regulation functions in a circuit between a tank and a fuel injector. The assembly's body has two parallel bores arranged side by side. An electrically powered heater is disposed in one bore to heat fuel passing to the injector. The second bore is divided by a transverse wall which has a central hole. A thermal motor actuator is disposed in this second bore on one side of the transverse wall, and a spring-biased valve is disposed in the same bore on the opposite side of the transverse wall. The thermal motor actuator operates the spring-biased valve via a tubular element which passes through the hole in the transverse wall, and controls the recirculation of excess fuel returning from the injector. As the temperature of the fuel passing across the thermal motor actuator becomes relatively warmer, the thermal motor actuator acts to cause a decreasing proportion of the return fuel to recirculate directly to the heater and correspondingly an increasing proportion to recirculate back through the tank. The pressure regulator mounts in a sealed manner on the body's exterior.

23 Claims, 3 Drawing Sheets

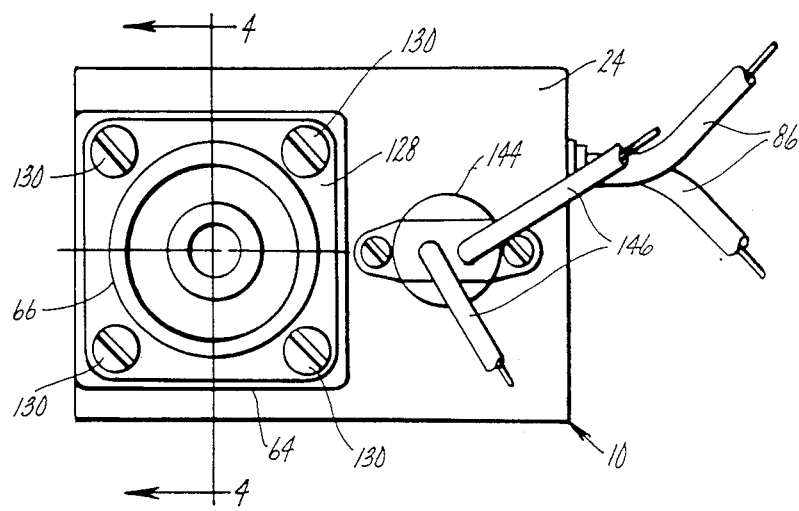
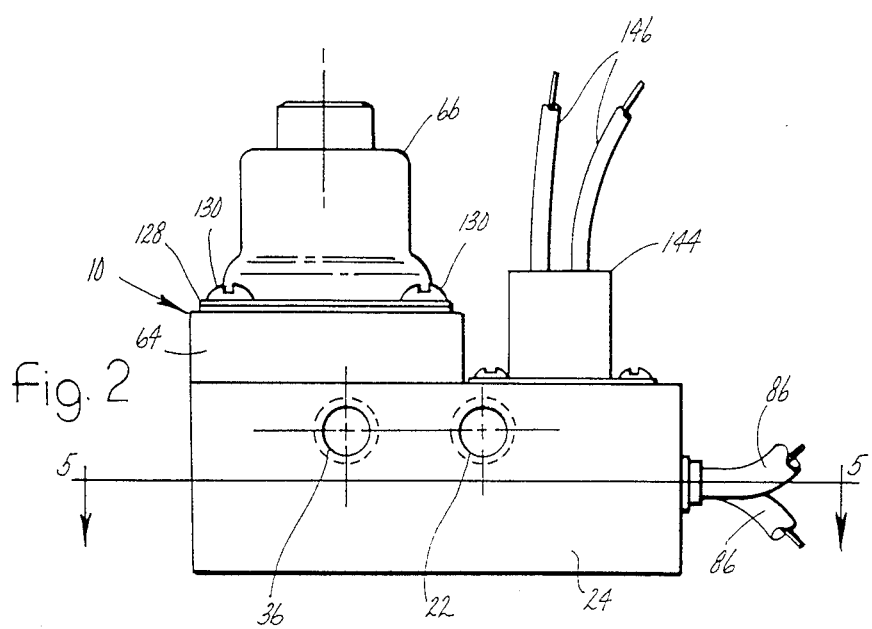
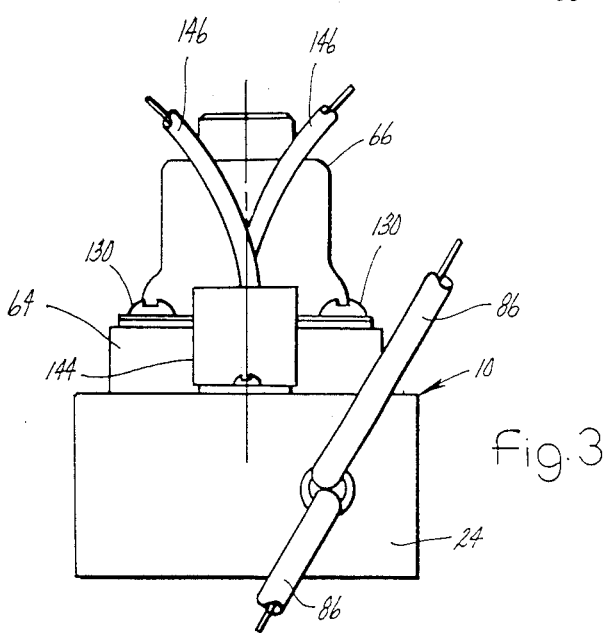
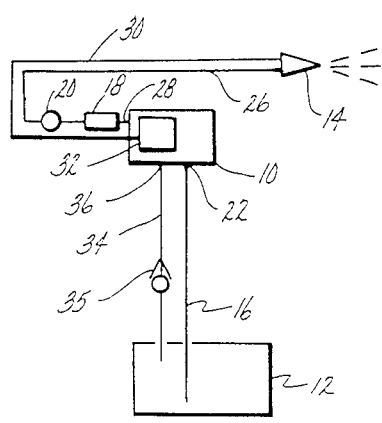

FUEL CONDITIONER ASSEMBLY

BACKGROUND AND SUMMARY OF THE INVENTION

This invention relates to a fuel conditioner assembly for use in a liquid fuel handling system between a supply of liquid fuel and a point of utilization where the fuel is atomized and combusted to provide power for a heat engine, more particularly in a liquid fuel circuit between a supply tank containing liquid fuel, and one or more injectors where the fuel is atomized. The fuel conditioner performs liquid fuel heating and pressure regulation functions.

The basic idea of using an electric heater to heat fuel prior to delivery for combustion is illustrated in U.S. Pat. No. 1,350,871. U.S. Pat. No. 2,599,699 discloses a fuel system in which the recirculation of liquid fuel in the fuel circuit is thermostatically controlled by a mixing valve such that during warm-up, return fuel from the injectors is recirculated to the injectors by-passing the tank, and after warm-up, the return fuel from the injectors is recirculated through the tank. U.S. Pat. No. 2,988,075 shows a fuel heater containing a thermostatically controlled valve, and an associated pressure regulator combined with the valve. Thus, the general elements of an electric heater, a thermostatically controlled valve, and a pressure regulator are known in fuel handling systems where fuel is delivered from a supply tank to a device which atomizes the fuel.

The following additional U.S. patents were also developed in a preliminary search conducted with respect to the fuel conditioner assembly of the present invention:

| | | |
|---|---|---|
| 3,768,730 | 4,231,342 | 4,386,584 |
| 3,779,007 | 4,359,972 | 4,440,138 |
| 4,056,086 | 4,372,260 | 4,452,213 |
| 4,187,813 | 4,377,149 | 4,454,851 |
| 4,228,776 | 4,385,615 | |

The present invention relates to a fuel conditioner assembly in which the fuel heating and pressure regulation functions are performed by a new and unique organization and arrangement of various parts. The invention provides a compactness to the overall size of the assembly and enables the assembly to be fabricated and to perform in an efficient manner.

The fuel conditioner assembly of the invention comprises, in its preferred embodiment, a generally rectangular body having two parallel bores arranged side by side. An electrically powered heater is disposed in one bore. The second bore is divided by a transverse wall which has a central hole. A thermal motor actuator is disposed in this second bore on one side of the transverse wall, and a spring-biased valve is disposed in the same bore on the opposite side of the transverse wall. The thermal motor actuator operates the spring-biased valve via a tubular element which passes through the hole in the transverse wall. Fuel from the tank enters the assembly via an inlet port at an entrance to the portion of the second bore which contains the thermal motor actuator. The fuel passes across the thermal motor actuator and exits the second bore through a slant passage to enter the first bore. The fuel flows through the first bore, passing along the heater to an outlet port where the fuel exits the assembly for passage to the injector. Return fuel from the injector enters the assembly at a return port immediately adjacent which a pressure regulator is disposed for pressure regulation action on the returning fuel just after the fuel enters the assembly. From the pressure regulator, the fuel moves through a skewed passage which extends to an entrance to that portion of the second bore which contains the spring-biased valve. The thermal motor actuator senses the temperature of liquid fuel which passes through that portion of the second bore within which the thermal motor actuator is disposed, and it exercises control over the spring-biased valve in accordance with the sensed fuel temperature. The spring-biased valve is biased by the spring to a position which results in essentially the entire return flow passing through a central hole in the valve and through the tubular element back to that portion of the second bore which contains the thermal motor actuator. When the thermal motor actuator senses only relatively cold fuel, it does not displace the valve from the postion to which the valve is spring-biased. As the temperature of the fuel passing across the thermal motor actuator becomes relatively warmer, the thermal motor actuator acts via the tubular element on the spring-biased valve in a manner which displaces the valve against the spring force. This causes a decreasing proportion of the return fuel entering the portion of the second bore which contains the valve to recirculate to the portion of the second bore which contains the thermal motor actuator, and correspondingly an increasing proportion to recirculate to the tank via a tank port which leads from that portion of the second bore which contains the valve. At the extent of maximum valve actuation by the thermal motor actuator, essentially all return fuel recirculates to the tank instead of to the portion of the second bore which contains the thermal motor actuator. The body of the assembly comprises a face containing a wall which is upright relative to that face and surrounds a region of that face. The pressure regulator mounts on the body in a sealed manner against the upright wall. The return port extends through the upright wall. The pressure regulator has a mechanism which acts in a direction normal to that region of the face bounded by the upright wall in coaction with a hole in the region leading to the previously mentioned skewed passage.

The foregoing features, advantages, and benefits of the invention, along with additional ones, will be seen in the ensuing description and claims, which should be considered along with the accompanying drawings. The drawings illustrate a preferred embodiment of the invention according to the best mode contemplated at this time for carrying out the invention.

BRIEF DESCRIPTION OF THE DRAWINGS

FIG. 1A is a schematic diagram of a representative fuel circuit in which the fuel conditioner assembly of the present invention is used.

FIG. 1 is a top plan view of a preferred embodiment of fuel conditioner assembly according to the invention.

FIG. 2 is a front elevational view of FIG. 1.

FIG. 3 is a right side elevational view of FIG. 1.

DESCRIPTION OF THE PREFERRED EMBODIMENT

Figure 4:
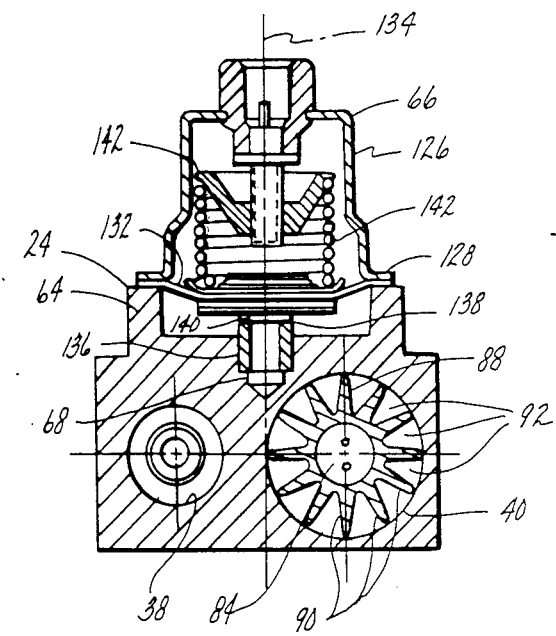
FIG. 4 is a vertical cross sectional view taken in the direction of arrows 4—4 in FIG. 1.

The drawings illustrate a fuel conditioner assembly 10 embodying principles of the invention. Like reference numerals in the several drawing FIGS. refer to like parts. FIG. 1A schematically shows assembly 10 connected in a representative fuel circuit between a fuel tank 12 and an injector 14.

An inlet conduit 16 extends from tank 12 to an inlet port 22 in the body 24 of assembly 10. An outlet conduit 26 containing a filter 18 and a pump 20 extends from an outlet port 28 in body 24 to injector 14. Fuel is drawn from the tank through assembly 10 and is pumped through conduit 26 in an amount greater than can be atomized by injector 14. A return conduit 30 extends from the injector back to a return port 32 in body 24 to convey the excess pumped fuel back to assembly 10. A tank conduit 34 containing a check 35 extends from a tank port 36 in body 24 back to tank 12. The return fuel which enters assembly 10 at return port 32 is recirculated in a selective manner, hereinafter described in detail, either directly back through body 24 and then conduit 26 to the injector, or back via conduit 34 through tank 12 for subsequent pumping to inlet port 22. The relative proportions of fuel recirculated, directly through assembly 10 on the one hand, and back through tank 12 on the other hand, are controlled by assembly 10 as a function of fuel temperature.

The detailed construction of assembly 10 is presented in FIGS. 1–8. Body 24 is a metal part of generally rectangular shape, for example aluminum, of a suitable composition treated in a conventional manner to resist potentially corrosive effects of fuel. Body 24 comprises two parallel bores 38, 40 arranged side by side. The axes of the two bores are designated by the numerals 42, 44 respectively. Details of bores 38, 40 are perhaps most clearly seen in FIG. 6.

Bore 38 is open at both ends of body 24. It is however divided by a transverse wall 46 into a shorter segment 48 on the left as viewed in FIG. 6, and a longer segment 50 on the right. A circular hole 52 extends through wall 46 between the two bore segments 48 and 50 coaxially with axis 42. The open ends of the two bore segments contain counterbores 54, 56 respectively, and bore segment 48 contains a second counterbore 58.

Inlet port 22 comprises a tapped hole which intercepts bore segment 50 in a generally tangential fashion just to the right of wall 46. Tank port 36 comprises a tapped hole which is arranged parallel and to the left of inlet port 22, as viewed in FIGS. 2 and 6. Tank port 36 intercepts bore segment 48 at its innermost point, but does not intercept hole 52, nor bore segment 50.

Bore 40 is open at the right end of body 24 and contains a counterbore 60 at the same end. The left end of bore 40 is closed by a transverse wall 62 containing a tapped throughhole coaxial with axis 44 and forming outlet port 28.

Figure 7:
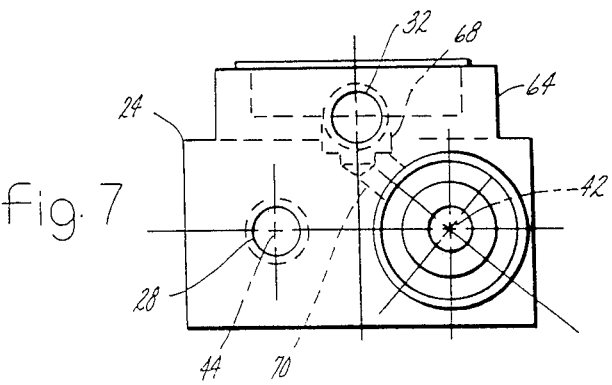
FIG. 7 is a left side elevational view of the body with certain internal portions shown by broken lines.
Figure 8:
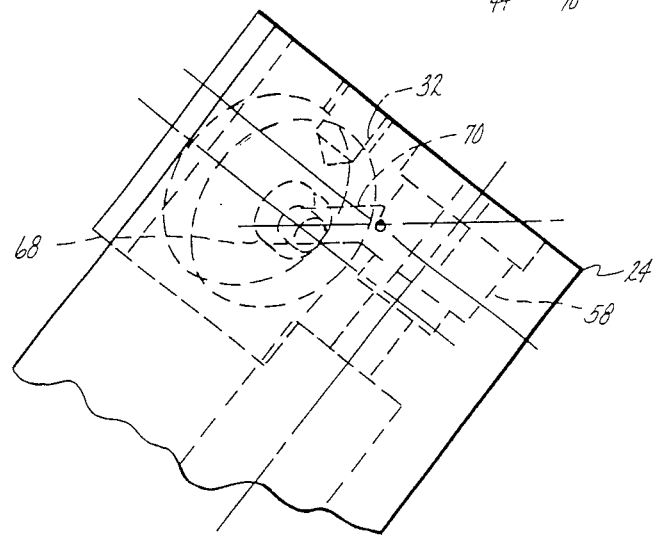
FIG. 8 is a fragmentary view projected from the view of FIG. 7 for further illustration of details.

FIGS. 7 and 8 show further detail of body 24. The upper face of body 24 as seen in FIG. 7 contains an upright wall 64 which completely surrounds a region of that face occupying roughly the left half of the body as viewed in FIGS. 1 and 2. The outside of wall 64 has essentially a square shape while the inside has a circular shape. A pressure regulator 66 (FIGS. 1–4) mounts on body 24 in a sealed manner with respect to wall 64. Details of the pressure regulator will be explained later.

Return port 32 comprises a tapped hole which extends through the left side of wall 64, midway between and slightly above axes 42, 44 as viewed in FIG. 7. The axis of the return port lies on a radial to the circular inside surface of wall 64. The circular face of body 24 which is circumscribed by the inside surface of wall 64 contains a central circular blind hole 68. The inner wall of hole 68 is intercepted by a skewed hole 70 extending from counterbore 58 (see also FIG. 8, which is a fragmentary projected view of FIG. 7).

Figure 6:
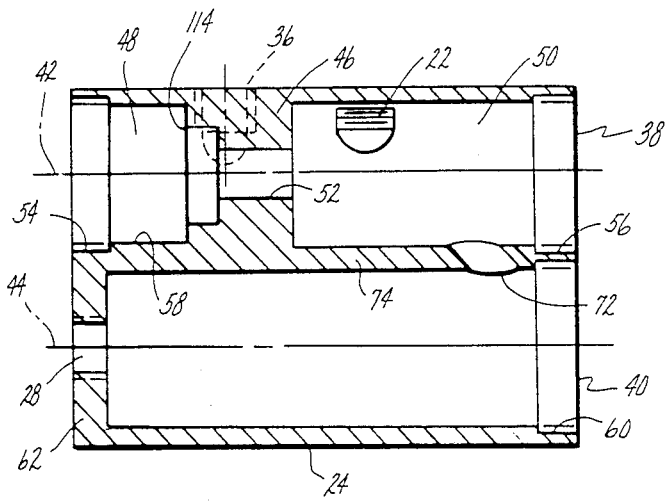
FIG. 6 is a horizontal sectional view through the fuel conditioner assembly's body shown by itself for illustrating certain details of the body.

As best seen in FIG. 6, body 24 also comprises a slant passage 72 which extends through the wall 74 separating the two bores 38, 40 to communicate bore segment 50 with bore 40.

Figure 5:
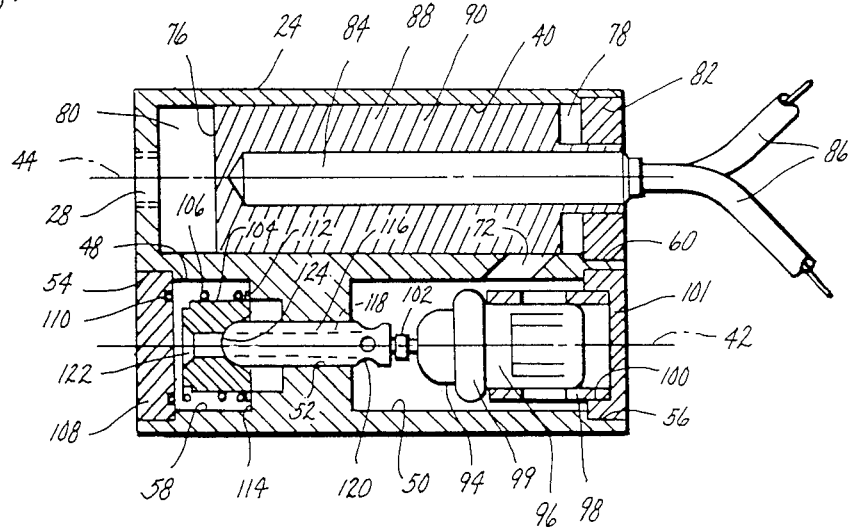
FIG. 5 is a horizontal cross sectional view taken in the direction of arrows 5—5 in FIG. 2.

FIG. 5 shows that a heater 76 is disposed within bore 40. The overall length of the heater is less than that of the bore so that there is a manifold space 78 at the right end and a manifold space 80 at the left end. A circular closure 82 fits in a sealed manner in counterbore 60, and serves to locate the heater axially within bore 40 so that the manifold spaces are thereby accurately defined.

The heater comprises a tubular core 84 which has two insulated electric wires 86 extending from its right hand end. A metal tube 88 having fins 90 is fitted onto core 84. The right end of tube 88 is necked down and fitted in a sealed manner in a central circular hole in closure 82. Wires 86 are available for electric circuit connection in a manner to be described later. FIG. 4 shows fins 90 circumferentially spaced in a uniform pattern around the heater. The spaces between the fins form axially extending passages 92 for fuel flowing through bore 40.

Fuel enters bore 40 via slant passage 72 from bore segment 50. Manifold space 78 communicates the fuel to the right hand ends of passages 92. The fuel flows along passages 92 to the other manifold space 80 where it passes through outlet port 28. When the heater is energized by electric current, it generates heat which is transferred to the fuel which flows over the outside surface of finned metal tube 88.

A thermal motor actuator 94 is disposed within bore segment 50 (see FIG. 5). Actuator 94 comprises a cylindrical body 96 which is fitted into one end of a mounting tube 98. A flange 99 of body 96 serves to axially locate the body on the tube by abutting the end of the tube. The opposite end of mounting tube 98 in turn is fitted into a hole 100 on the inner face of a circular closure 101 which fits in counterbore 56 in a sealed manner. Actuator 94, tube 98, and closure 101 are coaxial with axis 42.

Figure 5A:
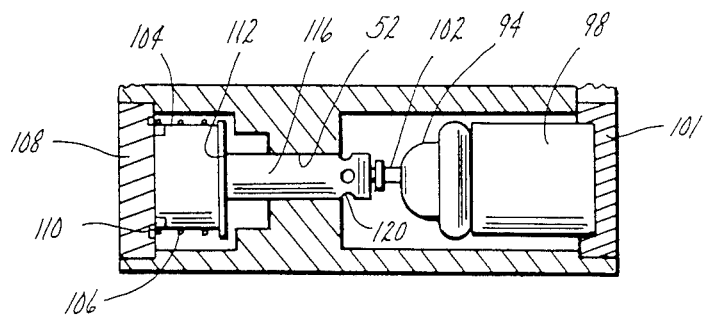
FIG. 5A is a fragmentary view illustrating a different operating position from the view of FIG. 5.

An acutating element 102 projects coaxially from body 96 at the end of the body which is opposite the end which is disposed in tube 98. Actuating element 102 is shown in FIG. 5 in a retracted position, which is the position which the actuator assumes when the temperature to which it is exposed is relatively cold. As the temperature increases, element 102 progressively extends from the retracted position. The fragmentary view of FIG. 5A shows a representative extended position.

A spring-loaded valve is disposed in counterbore 58 of bore segment 48. The valve member is generally circular in shape and is designated by the numeral 104. The spring is identified by the numeral 106. A closure 108 fits in counterbore 54 in a sealed manner. One end of spring 106 seats in a circular groove 110 in closure 108 while the opposite end of the spring bears against a circular flange 112 extending around valve member 104 at the end opposite the end of the valve member which confronts closure 108. The spring action biases valve member 104 to the right as viewed in FIG. 5 so that flange 112 seats against a shoulder 114 formed by counterbore 58. The overall axial length of valve member 104 is less than the axial length of counterbore 58 by an amount essentially corresponding to the travel of actuating element 102 between its fully contracted and its fully extended positions in the assembly. Hence FIG. 5 shows the left end of the valve member to be spaced from closure 108 by essentially this amount.

A tubular element 116 passes through hole 52 between actuating element 102 and valve member 104. The element 116 has a close fit with hole 52. The end of the element which is acted upon by actuating element 102 is closed; the opposite end which confronts valve member 104 is open. A tubular passage 118 through element 116 extends from its open axial end and deadends at the opposite closed end. A series of radial holes 120 just beyond the closed end communicate passage 118 to bore segment 50. A hole 122 through valve member 104 aligns with and forms a continuation of passage 118.

Hence, the condition portrayed by FIG. 5 is one in which bore segment 48 is communicated with bore segment 50 through valve member 104 and tubular element 116. At the same time, the seating of the valve member's flange 112 against shoulder 114 blocks flow from counterbore 58 to tank port 36.

When actuating element 102 is fully extended in the assembly, valve member 104 is unseated from shoulder 114, and the left hand end of the valve member is forced against closure 108. Hence, the condition portrayed by FIG. 5A represents one in which fuel in counterbore 58 is blocked from flowing through valve member 104 and tubular element 116 to bore segment 50 while flow from counterbore 58 to tank port 36 is permitted. For intermediate positions of actuating element 102 between the two extremes just described, a portion of the flow from counterbore 58 is to bore segment 50 while the remainder is to tank port 36. The relative proportions of the divided flow will be a function of the amount of extension of the actuating element from the thermal motor actuator body, and hence, a function of the fuel temperature sensed by thermal motor actuator.

The extension force of actuating element 102 is opposed by the spring force of spring 106. The open end of tubular element 116 is advantageously made rounded to be received within a similarly rounded cavity 124 in the end of valve member 106 concentric with hole 122. Tubular element 116 is guided for travel by its fit in hole 52, and its ends simply abut valve member 104 and actuating element 102. This eliminates the need for any mechanical attachments between the actuating element, the tubular element, and the valve member. These parts are conveniently assembled into the body, with element 116 being placed into hole 52 via one end of bore 38, the thermal motor actuator and the spring-loaded valve being inserted into their respective bore segments, and then the closures inserted into the counterbores 54 and 56.

The organization and arrangement of the spring-loaded valve in bore segment 48 is especially advantageous. From one axial side, valve member 104 is acted upon by spring 106 and from the opposite side, by element 116. Because of the ball and socket type of abutting fit between the left end of element 116 and the right face of valve member 104, the axis of the valve member can tip relative to the axes of both element 116 and bore segment 48. Likewise spring 106 does not act as a constraint against such tipping. Consequently, the spring-loaded valve possesses a certain ability to float. This renders parallelism between shoulder 114 and the interior face of closure 108 not especially critical; nor between opposite faces of the valve member. So long as the opposite faces of the valve member, the shoulder 114, and the interior face of closure 108 are flat, the right face of the valve member will have full circumferential closure contact against shoulder 114 when element 102 of actuator 94 is fully retracted in the assembly, and the left face of the valve member will have full circumferential closure contact with closure 108 around hole 122 when element 102 is fully extended in the assembly. Accordingly, there is less criticality in the fabrication of the valve member and the valve body bore segment 48, a desirable result.

Pressure regulator 66 comprises a tower 126 which fits over wall 64. The tower has a flange 128 at its base conforming to the square shape of the outside of wall 64. Screws 130 pass through holes at the four corners of the base flange and into corresponding tapped holes in wall 64 to secure the pressure regulator in assembly on body 24. The periphery of a diaphragm 132 is held between flange 128 and the rim of wall 64 in a sealed manner when screws 130 are tightened to secure the flange on the wall.

The axis 134 of the pressure regulator and its mechanism is coaxial with hole 68. A circular cylindrical seat element 136 is fitted to hole 68 with the exposed end of the element forming a seat 138 against which the pressure regulator mechanism coacts to perform the pressure regulating function. A circular disc 140 is supported centrally on diaphragm 132 for coaction with seat 138. The diaphragm is spring biased by a spring 142 to urge disc 140 into closure against seat 138. The amount of spring-bias force is adjustable by an adjusting mechanism 142 which is accessible from the far exterior end of tower 126.

Return fuel entering body 24 through return port 32 acts against diaphragm 132 in opposition to the spring force. A sufficient pressure will displace the diaphragm to crack disc 140 from seat 13S so that fuel can pass through element 136 and into hole 68. At a steady state condition, the force of fuel acting on the diaphragm just overcomes the downward spring force to crack the disc in an amount such that this pressure is maintained, thereby resulting in the pressure regulation function.

The assembly also comprises a thermal switch assembly 144 which is disposed against and fastened to the exterior of body 24 on the same face as pressure regulator 66 but toward the opposite end. The sensing point of the assembly 144 is equidistant from the two bores 38, 40 to sense the temperature of the body adjacent where fuel enters the heater. The switch assembly 144 operates to control the flow of electric current to heater core 84. Assembly 144 comprises two insulated electric wires 146. One of the wires 146 connects to one of the wires 86; the other wire 146 and other wire 86 connect to a source of electric power. When the temperature sensed by assembly 144 is below a threshold, it is closed to complete a circuit from the electric power source to the heater causing current to flow to the heater and heat the fuel. When the sensed temperature is above the threshold, the assembly is open circuit so that no current flows to the heater, and hence no fuel heating is performed by the heater.

When the fuel conditioner assembly is connected in the representative circuit of FIG. 1A, fuel pumped from tank 12 initially flows across thermal motor actuator 94. Assuming that the fuel is relatively cool, actuator element 102 is fully retracted thereby causing valve member 104 to block the return fuel flow from tank port 36. Accordingly, the return fuel flows through the assembly and back to the injector, by-passing the tank. The heater is operated at this time to heat the fuel which passes along it.

As the temperature of the return fuel rises due to the influence of the heater, a point is reached where the actuator begins to move the valve member. Accordingly, a decreasing percentage of return fuel is directly conducted through bore 38 and an increasing percentage of the return fuel now flows to the tank. The flow by-passing the tank continues to be favored until the valve has been displaced in an amount causing the return flow to divide in half. Thereafter, further displacement of the valve member by the actuator increasingly favors flow to the tank. At full extension, essentially all return flow is to the tank. The pressure regulator acts at all times on the return flow to set the pressure.

The disclosed assembly represents a compact and an efficient organization and arrangement of parts. The body can be fabricated by conventional procedures. The two parallel bores and their counterbores are drilled and finished. The slant and skewed holes are drilled on angles via the open ends of the bores after the latter have been drilled. Other holes are drilled and finished with conventional tools. The internal parts are conventionally fabricated and can be conveniently assembled. Use of a wax pellet type thermal motor actuator and of an appropriate spring-bias for the valve member provides satisfactory control without criticality. Although the actuator will develop sufficient force to displace the valve member against the spring force, tendency for potential damage due to overloading when the valve member abuts the closure member is minimized because such an actuator inherently has a low stall force. The exact characteristics of an assembly according to the invention, and the particular component parts which are used, will be determined through the application of conventional engineering and design principles.

While a preferred embodiment of the invention has been disclosed, it will be appreciated that principles are applicable to other embodiments.

I claim:

1. A liquid fuel conditioner for use with a liquid fuel handling system wherein liquid fuel is pumped from a tank to a utilization means where the fuel is atomized and combusted to power an engine and excess fuel pumped to the utilization means is returned from the utilization means, said liquid fuel conditioner comprising:

a body having an inlet port for connection to receive liquid fuel pumped from the tank, an outlet port for connection to the utilization means to convey the pumped fuel to the utilization means, a return port for connection to the utilization means to receive return fuel from the utilization means, and a tank port for connection to the tank to convey liquid fuel back to the tank, separate fuel passages within said body, one fuel passage which extends from said inlet port to said outlet port, and another fuel passage which extends from said return port and branches to said tank port and to said one fuel passage, a selectively operable heater in said one fuel passage for heating liquid fuel before it passes from said outlet port, a sensor for sensing temperature of liquid fuel flowing through said one passage upstream of said heater, valve means disposed in said another fuel passage and operated by said sensor via an operative connection that passes through a throughhole in a wall that separates said one fuel passage from said another fuel passage for directing fuel entering said return port selectively to said tank port and to said one fuel passage by favoring flow to said one fuel passage over one range of temperature sensed by said sensor and by favoring flow to said tank port over another range of temperature sensed by said sensor, and pressure regulator means disposed on said body in cooperation with said another fuel passage to regulate the liquid fuel pressure.

2. A liquid fuel conditioner as set forth in claim 1 in which said body comprises two parallel bores arranged side by side, said one passage comprises the entirety of one of said two bores and a portion of the other of said two bores, said another passage comprising another portion of said other bore.

3. A liquid fuel conditioner as set forth in claim 2 in which said heater is disposed in said one bore.

4. A liquid fuel conditioner as set forth in claim 3 in which said heater comprises a tubular core which is substantially concentric with said one bore and a series of fins radiating from the tubular core so that the heater and said one bore cooperatively define a series of flow paths surrounding the tubular core between the fins for the liquid fuel.

5. A liquid fuel conditioner as set forth in claim 4 in which one end of said one bore is closed by a closure member, one end of said tubular core is disposed in a central hole in the closure member, and the heater is electrically powered via wires which extend through the hole in the closure member so that the heater can be connected to an external electrical source of power for energizing the heater.

6. A liquid fuel conditioner as set forth in claim 5 in which said outlet port is in the end of said one bore opposite the closure member, said outlet port comprising a hole having a diameter less than that of said one bore, and wherein the heater stops short of the end of said one bore opposite the closure member.

7. A liquid fuel conditioner as set forth in claim 3 in which said sensor is disposed in the first-mentioned portion of said other bore and said valve means is disposed in said another portion of said other bore.

8. A liquid fuel conditioner as set forth in claim 7 in which said wall is a transverse wall across said other bore dividing said first-mentioned portion of said other bore from said another portion of said other bore.

9. A liquid fuel conditioner as set forth in claim 8 in which said operative connection comprises a tubular element which passes through said throughhole with a close fit and which serves to conduct fuel from the return port to said one fuel passage when said valve means is being operated by said sensor to allow such flow.

10. A liquid fuel conditioner as set forth in claim 9 in which said valve means comprises a valve member which is spring-biased against a seat in said another portion of said other bore, and when so seated, closes the tank port to flow from said return port, and in which said valve member is disposed to be unseated from said seat by the operation of said sensor acting through said tubular element.

11. A liquid fuel conditioner as set forth in claim 10 in which said valve member has a throughhole aligned with said tubular element and when said valve member is seated against said seat, said last-mentioned throughhole provides for flow from the return port to pass through the valve member and into the tubular element.

12. A liquid fuel conditioner as set forth in claim 11 in which a closure member closes the end of said another portion of said other bore opposite said transverse wall, and in which said valve member is moved against said closure member by the operation of the tubular element by the sensor to block said valve member's throughhole and thereby close said one passage to flow from said return port.

13. A liquid fuel conditioner as set forth in claim 12 in which the spring which biases said valve member is disposed between the closure member and a flange on said valve member, and said seat comprises an annular shoulder against which said flange abuts when the valve member is seated on said seat.

14. A liquid fuel conditioner as set forth in claim 13 in which said tank port is disposed to intercept said another portion of said other bore to one side of said shoulder, and said pressure regulator means is disposed in cooperation with said another fuel passage to the opposite side of said shoulder.

15. A liquid fuel conditioner as set forth in claim 14 in which said return port is non-co-axial with said other bore, said another portion of said other bore is intercepted by a skewed bore through which fuel entering said return port is conducted to said another portion of said other bore, and said pressure regulator comprises a mechanism mounted on said body and acting on said another fuel passage at a point between said return port and said skewed bore.

16. A liquid fuel conditioner as set forth in claim 15 in which said body comprises a face containing an upright wall which is upright relative to said face and bounds a region of said face, said return port extends through said upright wall, a hole is in the region of said face bounded by said upright wall to extend to communicate with said skewed bore, and said pressure regulator means is disposed on said face and has a sealed contact with said upright wall.

17. A liquid fuel conditioner as set forth in claim 16 in which said pressure regulator means comprises a tower containing mechanism for setting and regulating the pressure, said mechanism having a line of action which is normal to said face and coaxial with said hole which is bounded by said upright wall, and said mechanism acts by cooperatively acting with an annular seat disposed in said hole.

18. A liquid fuel conditioner as set forth in claim 7 in which said sensor comprises a thermal motor actuator having a body and means mounting the thermal motor actuator's body on a closure member which closes one end of said other bore.

19. A liquid fuel conditioner as set forth in claim 18 in which said one passage comprises a skewed bore which communicates said other bore to said one bore.

20. A liquid fuel conditioner as set forth in claim 18 including a thermal switch externally mounted on the first-mentioned body against a further wall of that body which overlies both bores, and in which the terminal switch is disposed substantially at an imaginary plane which is equally distant from the two bores and adapted for controlling the operation of said heater.

21. A liquid fuel conditioner for use with a liquid fuel handling system wherein liquid fuel is pumped from a tank to a utilization means where the fuel is atomized and combusted to power an engine and excess fuel pumped to the utilization means is returned from the utilization means, said liquid fuel conditioner comprising:

a body having an inlet port for connection to receive liquid fuel pumped from the tank, an outlet port for connection to the utilization means to convey the pumped fuel to the utilization means, a return port for connection to the utilization means to receive return fuel from the utilization means, and a tank port for connection to the tank to convey liquid fuel back to the tank, fuel passages within said body, one fuel passage extending from said inlet port to said outlet port, and another fuel passage extending from said return port and branching to said tank port and to said one fuel passage, a heater for heating liquid fuel as it passes from said inlet port to said outlet port, a sensor for sensing temperature of liquid fuel flowing through said one fuel passage, valve means disposed in said another fuel passage and operated by said sensor for directing fuel entering said return port selectively to said tank port and to said one fuel passage by favoring flow to said one fuel passage over one range of temperature sensed by said sensor and by favoring flow to said tank port over another range of temperature sensed by said sensor, and pressure regulator means disposed on said body to regulate the liquid fuel pressure, said body comprising a face containing an integral upright wall which is upright relative to said face and bounds a region of said face, said return port extends through said upright wall, a hole is in the region of said face bounded by said upright wall, said pressure regulator means is disposed on said face and has a sealed contact with said upright wall, and said pressure regulator means comprises a tower containing mechanism having a line of action which is normal to said face and coaxial with said hole which is bounded by said upright wall, and said mechanism acts to regulate the pressure by cooperatively acting with said hole.

22. A liquid fuel conditioner for use with a liquid fuel handling system wherein liquid fuel is pumped from a tank to a utilization means where the fuel is atomized and combusted to power an engine and excess fuel pumped to the utilization means is returned from the utilization means, said liquid fuel conditioner comprising:

a body having an inlet port for connection to receive liquid fuel pumped from the tank, an outlet port for connection to the utilization means to convey the pumped fuel to the utilization means, a return port for connection to the utilization means, and a tank port for connection to the tank to convey liquid fuel back to the tank, fuel passages within said body, one fuel passage extending from said inlet port to said outlet port, and another fuel passage extending from said return port and branching to said tank port and to said one fuel passage, said body comprising two parallel bores arranged non-coaxially side by side to at least in part define said fuel passages, a heater disposed in one of said bores for heating liquid fuel as it passes from said inlet port to said outlet port, a sensor for sensing temperature of liquid fuel flowing through said one fuel passage, valve means disposed in the other of said bores and operated by said sensor for directing fuel entering said return port selectively to said tank port and to said one fuel passage by favoring flow to said one fuel passage when the temperature sensed by said sensor is in one temperature range and by favoring flow to said tank port when the temperature sensed by said sensor is in another temperature range.

23. A liquid fuel conditioner as set forth in claim 22 including pressure regulator means disposed on said body coacting on said other fuel passage to regulate the liquid fuel pressure.

* * * * *